United States Patent
Mathisen

[15] 3,649,046
[45] Mar. 14, 1972

[54] LOAD TRANSFERRING TRAILER HITCH AND TOW BAR

[72] Inventor: Martin H. Mathisen, Sun Valley, Calif.
[73] Assignee: Eaz-Lift Spring Corporation, Sun Valley, Calif.
[22] Filed: Feb. 10, 1970
[21] Appl. No.: 10,201

[52] U.S. Cl. ................... 280/406 A, 280/490 R, 280/491 R
[51] Int. Cl. .......................................................... B62d 53/00
[58] Field of Search ........................................ 280/406, 406.1

[56] References Cited

UNITED STATES PATENTS

| | | | |
|---|---|---|---|
| 2,320,046 | 5/1943 | Notar | 280/489 |
| 2,793,878 | 5/1957 | Toland | 280/406 A |
| 2,906,544 | 9/1959 | Watts | 280/406 A |
| 2,918,308 | 12/1959 | Lowman | 280/406 A |
| 2,952,475 | 9/1960 | Reese | 280/406 A |
| 3,220,749 | 11/1965 | Mathisen | 280/406 A |
| 3,353,842 | 11/1967 | Lewis | 280/406 A |
| 3,482,856 | 12/1969 | Reese | 280/405 A |
| 3,441,288 | 4/1969 | Boughner | 280/96.1 |
| 3,490,788 | 1/1970 | Mann | 280/406 A |
| 3,542,392 | 11/1970 | Cumming | 308/120 A |

*Primary Examiner*—Leo Friaglia
*Attorney*—Everett G. Clements

[57] ABSTRACT

A load transferring trailer hitch has a head assembly secured to the towing vehicle, the head assembly comprising a pair of trunnion members which pivot about axes which are perpendicular to top and bottom walls. Each trunnion member has a socket at right angles to the pivot axis which receives an end of a spring rod, the other end of each spring rod being secured under tension to a frame member of a trailer tongue. The ball portion of a ball and socket hitch connection is adapted to be secured to an inclined boss formed on each of the walls. The hitch is adapted to be used on towing vehicles of widely different road clearance by inverting the head assembly and securing the ball to whichever boss is on top. Due to the inclination of the bosses, the trunnion sockets and the spring rods are inclined downwardly to provide clearance for tensioning no matter which head plate is uppermost. End pins of the trunnions are completely enclosed in the head assembly in order to confine lubricants. The spring members are interlocked with the trunnions so as to be interchangeable and useable with either side up. The head assembly may be secured to the towing vehicle by a tow bar which is easily attached to and detached from the towing vehicle by a spring plate at one end and a key at the other end thus permitting relative twisting between the towing vehicle and the head assembly.

15 Claims, 18 Drawing Figures

INVENTOR
MARTIN H. MATHISEN

BY
ATTORNEY

Patented March 14, 1972  3,649,046

INVENTOR
MARTIN H. MATHISEN

BY
ATTORNEY

Patented March 14, 1972

INVENTOR
MARTIN H. MATHISEN

BY

ATTORNEY

Patented March 14, 1972

INVENTOR
MARTIN H. MATHISEN

BY

ATTORNEY

Patented March 14, 1972
3,649,046
6 Sheets-Sheet 6

INVENTOR
MARTIN H. MATHISEN

BY

ATTORNEY

LOAD TRANSFERRING TRAILER HITCH AND TOW BAR

BACKGROUND OF THE INVENTION

This invention relates generally to load transferring hitches of the type shown in my prior U.S. Pat. No. 2,597,657, May 20, 1952 and the patent to Ray C. Mathisen, U.S. Pat. No. 2,817,541, Dec. 24, 1957. Such hitches serve to distribute the load of a trailer between the front and rear wheels of a towing vehicle. For example, under ideal conditions if the tongue weight of a two wheel trailer is 600 lbs. before connection to a hitch of the type under discussion then after connection the hitch may be so adjusted that 100 lbs. of this tongue weight will be distributed to each wheel of the towing and trailing vehicle, assuming there are four wheels on the towing vehicle.

While such hitches are highly effective they are difficult to keep lubricated. Also, the spring bars are of relatively complex shape. Accordingly, such hitches lack the requisite sturdiness combined with qualities of simplicity, inexpensiveness and ease of assembly, Further, the connection of the hitch to the towing vehicle is such that when the towing vehicle and trailer twist with respect to each other due to irregularities in the road being traversed the spring bars are alternately under greater and less stress and also alternate stress on different sides of the towing vehicle. Also, the hitch connection to the towing vehicle is permanently installed and undesirably lowers the clearance of the towing vehicle even when not being used to tow a trailer. Moreover, the hitch does not lend itself readily to use with towing vehicles of widely differing road clearance.

SUMMARY OF THE INVENTION

It is an object of the invention to provide an improved load transferring hitch which is readily adaptable to towing vehicles having widely differing road clearances.

It is another object to provide a hitch which is permanently self-lubricated.

Another object is to provide a hitch of simple design and interchangeable parts which are so made as to greatly reduce the possibility of error in assembly.

Another object is to obtain an improved distribution of stress on the hitch and hitched vehicles by connecting the hitch to the frame of a towing vehicle by a tow bar which is resiliently connected to the frame independently of the vehicle springs.

Another object is to provide a tow bar to be positioned underneath a vehicle which may be readily assembled with or disassembled from the vehicle.

Another object is to provide a load transferring hitch in which the spring bars may be interchanged or used with either side up by the use of appropriate lugs at the trunnion end and appropriate shaft at the other.

To achieve the above objects and others which will become apparent as the description proceeds, I have provided a hitch including a head member in which is pivoted a pair of trunnion members having end pins which are enclosed so as to confine lubricants in order to insure quiet operation and longer life. The head member is so constructed that either side may receive the ball of a ball and socket hitch connection whereby either high or low towing vehicles may be accommodated. Spring bar members pulled up towards a portion of the hitch rigid with the trailer to transfer the load extend from the trunnions and these are arranged to incline downwards no matter which side of the head is uppermost. The spring bar members are provided with end structures which permit them to be interchangeable and used with either side up to reduce possibilities of error in assembly. The head may be rigidly secured to the towing vehicle but is preferably connected thereto by a tow bar which is resiliently attached to the vehicle independently of its springs so that it may oscillate on an axis longitudinally of the vehicle. With this arrangement the twisting motion of one vehicle with respect to the other encountered under some road conditions is largely absorbed by the resilient connection of the tow bar to the towing vehicle, thus achieving substantially equal tension on the spring bars and avoiding undue strain on either side of the towing vehicle.

DESCRIPTION OF THE PREFERRED EMBODIMENT

Figure 1:
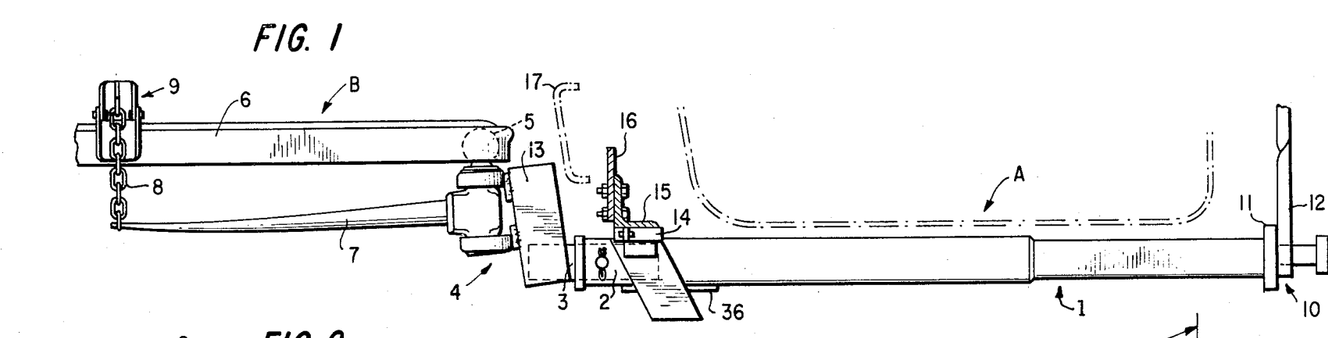
FIG. 1 is a side elevation of the hitch including a fragmentary view of the towing vehicle and the trailer tongue.
Figures 2, 11, 11A, 12:
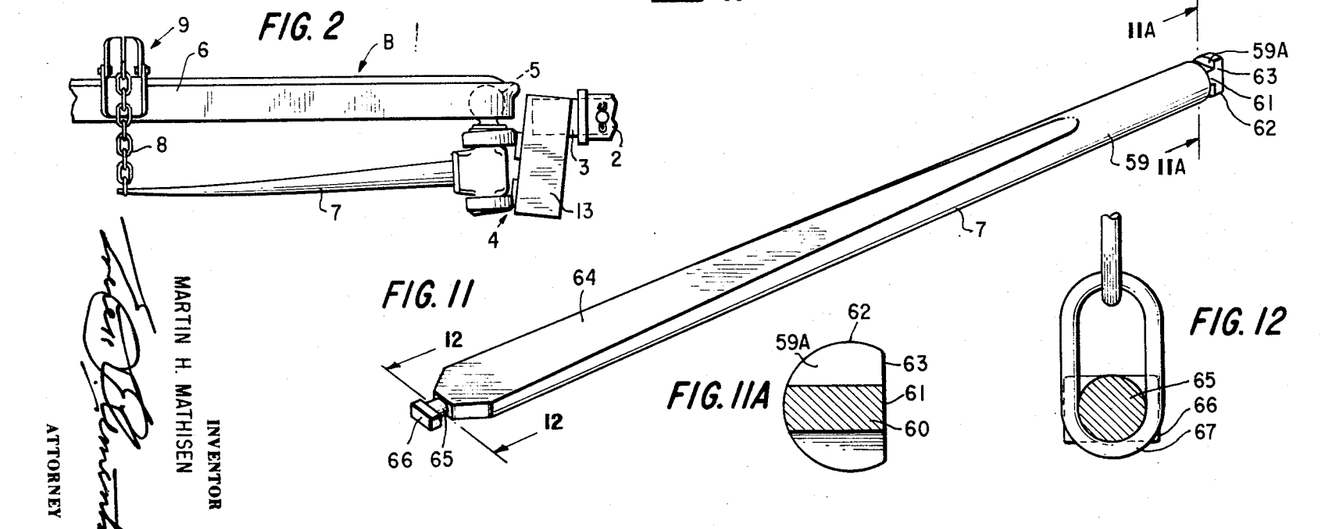
FIG. 2 is a fragmentary side elevation of the hitch showing the head in reversed position.
FIG. 11 is a perspective view of the spring bar.
FIG. 11A is a sectional view on line IIA—IIA of FIG. 11.
FIG. 12 is a sectional view on line 12—12 of FIG. 11 but including a portion of the chain in attached position.

As seen in FIG. 1 a towing vehicle schematically shown at A has detachably secured thereto a towing bar 1 having a socket end 2 which receives a shank bar 3 of a hitch head 4 which has attached thereto a ball 5 to receive a corresponding socket on a trailer tongue B. The trailer tongue is a conventional type having forwardly converging beam parts 6 as shown in the U.S. Pat. Nos. 2,597,657 and 2,817,541. Spring bars 7 extend from the hitch head. The rear ends of the spring bars are drawn up towards the tongue B by chains 8 attached to tensioning means 9 clamped to beams 6. The spring bars 7 are drawn up toward tongue B with considerable force and are bent under the stress as shown in FIGS. 1 and 2. The stressing of the spring bars effects the desired transfer of the trailer load to the towing vehicle, the whole hitch acting like a lever fulcrumed at point 10 to lift the trailer tongue up to horizontal position and exert downward force at 10 to transfer the load, it being understood that tow bar 1 is connected to a plate 11 and straps 12 which are connected to the towing vehicle, as more fully explained later in connection with FIGS. 13, 14 and 15.

As shown in FIG. 2 the position of head 4 may be reversed with the ball 5 secured to what was the lower face of the head. The inclined upright plates 13 of the head will then extend upwardly from the main head part rather than downwardly as in FIG. 1. The shank bar 3 is secured to plates 13 at any selected desired position so that the axis of ball 5 is maintained in the vertical position shown in FIG. 1 and may be in approximately the same position relative to plate 13 as in FIG. 1. With this structure of the head it is possible to use the same hitch structure with towing vehicles having a load road clearance as in FIG. 1 or a high road clearance for which the arrangement of FIG. 2 would be suitable.

Tow bar 1 is not only connected to towing vehicle A by plate 11 and straps 12 but by a cradle 14 welded to angle 15 which is bolted to strengthening bar 16 positioned behind bumper 17 of vehicle A. In the ordinary use of the hitch, bar 16, angle 15, cradle 14, straps 12 and plate 11 form permanent parts of the vehicle to which tow bar 1 is detachably secured and the bar 16, and straps 12 may be welded or bolted to rigid vehicle structure. The structure of the tow bar 1 and its connection to the vehicle will be more fully explained in the description of FIGS. 13, 14 and 15.

Figure 3:
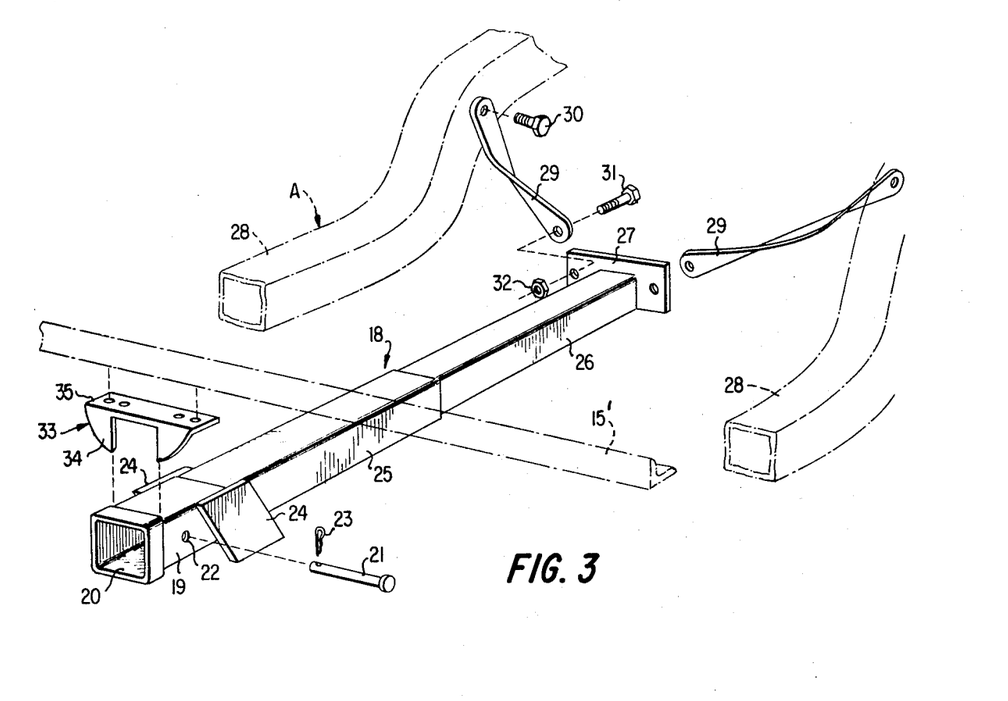
FIG. 3 is an exploded perspective view of a standard towing bar with which the hitch head of FIGS. 1 and 2 may be assembled, a fragment of the towing vehicle also being shown.

Instead of the tow bar 1 of FIG. 1 the shank 3 may be secured to the towing vehicle A by a standard type tow bar 18. Tow bar 18 is similar in many respects to tow bar 1 but differs therefrom in vital details as pointed out hereinafter. Tow bar 18 has a socket part 19 which has an interior 20, square in cross section, to snugly receive the correspondingly shaped shank 3. The shank is held in the socket by locking pin 21 passing through holes 22 on each side of the socket and a matching hole 22A in the shank and held in place by a clip 23 received in a hole in pin 21. Plates 24 are welded to each side of the socket. A tubular strut 25 is received between the plates 24 and welded thereto as well as to the forward end of socket 19. Tubular strut 26 is telescopically received within the forward end of strut 25 and welded thereto. Welded to the forward end of strut 26 is plate 27. Plate 27 is secured to side frame members 28 of vehicle A by straps 29 which are secured to the frame members by bolts 30 and to the plate 27 by bolts 31 and nuts 32. An angle bracket 33 has depending leg portions 34 welded to socket 19 and a horizontal leg 35 bolted to the bottom of angle member 15' which is secured to frame member 28. If desired, a bottom reenforcing strip such as shown at 36 in FIG. 1 may be welded to the bottom of the socket 19, the strut 25 and to the plates 24. The tow bar 18 once installed on a vehicle A is not intended to be taken off in ordinary use and in effect becomes a permanent part of the vehicle. The strut 25 may be welded to the plates 24 and socket 19 at various vertical locations, with the reenforcing plate 36 being suitably bent to fit on the bottom of parts 19 and 25. The strut 26 may be telescoped into strut 25 any suitable amount. Thus with this arrangement of parts the tow bar 18 may be suitably altered to conform to the configuration of any vehicle and be attached to any vehicle parts available for such purpose.

The hitch head structure 4 shown in detail in FIGS. 4-10 will now be described. The head has a top wall 36 and bottom wall 37 on which are pivoted the pins 38 of trunnion members 39. The longitudinal axis 40 of the pins 38 is perpendicular to the walls 36 and 37. Wall 36 comprises a main plate 41 having holes 42 at each end to receive the pins 38 of the trunnions and a central hole 43 to receive the shank of ball 5. Welded to each end of main plate 41 are gusset plates 44. Each gusset plate 44 has a hole 45 to receive the pin 38 of a trunnion and a downturned and backwardly inclined flange 46. Press fitted over plate 41 and gussets 44 is a cover 47 having a downturned flange 48. The downturned flange 48 has lugs 149 struck out from it at suitable intervals to engage the underside of the gusset plates 44. The cover also has boss 49 with a central hole 50 for receiving the shank of the ball and a surrounding surface 51 on which a shoulder portion of the ball rests. The surface 51 makes an angle 52 with the plane 53 of cover 47. Angle 52 may suitable be 3°.

Bottom wall 37 has parts corresponding to the top wall, namely a main plate 41' having holes 42' at each end to receive a trunnion pin and a central hole 43' to receive the shank of ball 5 at such time as the head 4 is inverted from the position shown in FIGS. 5-10. Welded to each end of main plate 41' are gusset plates 44'. Each gusset plate has a hole 45' to receive the pin of a trunnion and an upwardly and forwardly inclined flange 46'. Press fitted over plates 41' and gussets 44' is a cover 47' having an upturned flange 48'. The upturned flange has lugs 149' struck therefrom at suitable intervals to engage the upperside of gussets 44'. Cover 47' also has a boss 49' with a central hole and a surrounding surface 51' to receive the shoulder of a ball at such time as the bottom wall is uppermost. The surface 51' makes an angle 52', suitably 3°, with the plane 53' of the cover 47'.

Figure 6:
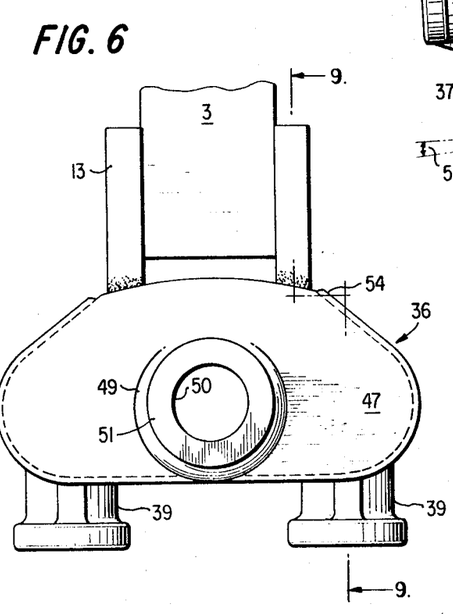
FIG. 6 is a plan view of the hitch head.
Figure 7:
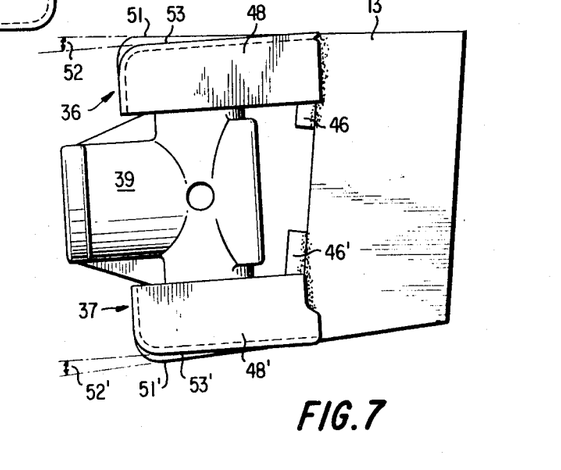
FIG. 7 is a side elevation of the hitch head.

Upright and inclined plates 13 are welded to main plates 41 and 41' and gusset plate flanges 46 and 46'. The upper and lower cover flanges 48 and 48' are cut away as shown at 54 in FIG. 6 to accommodate plates 13. As shown in FIG. 6 shank 3 is received between the plates 13 and welded thereto. The plates 13 are secured to shank 3 in slightly different positions when head 4 in inverted so that at all times the surface 51 or 51' which is uppermost will be horizontal. Plates 13 are shown in FIG. 7 as terminating at the level of the covers but these plates may be suitably elongated as indicated in FIGS. 1 and 2. The upper wall 36 extends forwardly further than the lower wall 37 to provide clearance for tongue B relative to upright plates 13 as shown in FIG. 2.

A lubricant such as a powdered lubricant or a solid film air dried lubricant is applied to pins 38. In order to retain such lubricant and to provide a seat for the pins, urethane washers 55 and 55' are applied to the bases of the pins. To hold in the lubricant at the top felt gaskets 56 and 56' are positioned over the pins between the main plates 41, 41' and the covers 47, 47'. With this arrangement of lubricant and seals noise and wear in the use of the hitch will be eliminated or minimized and lifetime maintenance free lubrication is attained.

Figure 5:
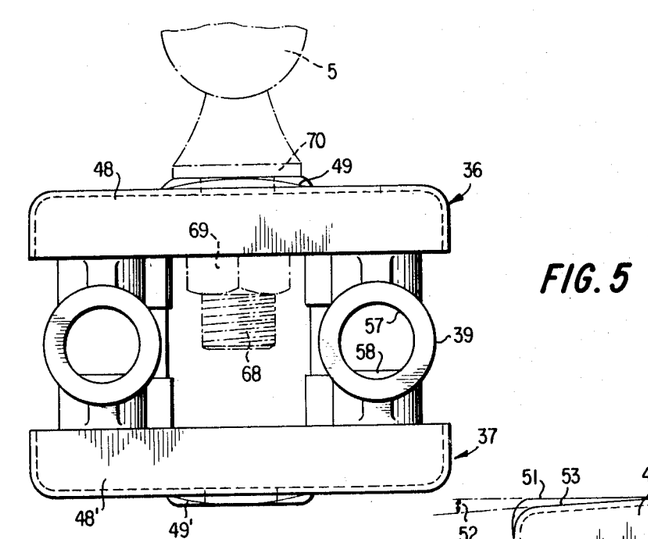
FIG. 5 is a rear elevation of the hitch head with an attached ball shown in phantom lines.
Figure 8:
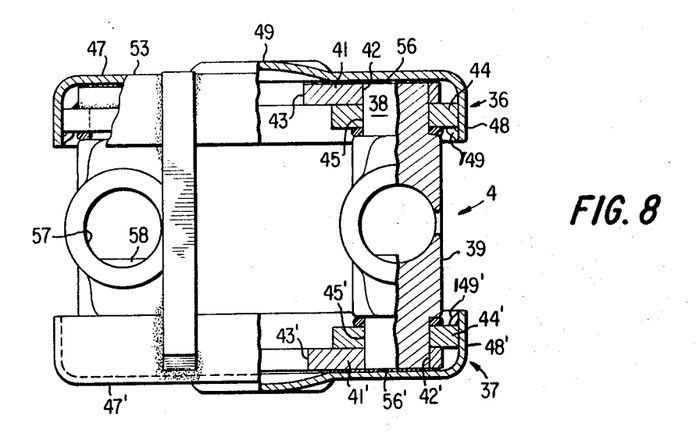
FIG. 8 is a rear elevation of the hitch head partly in section and partly cut away.
Figures 9, 10:
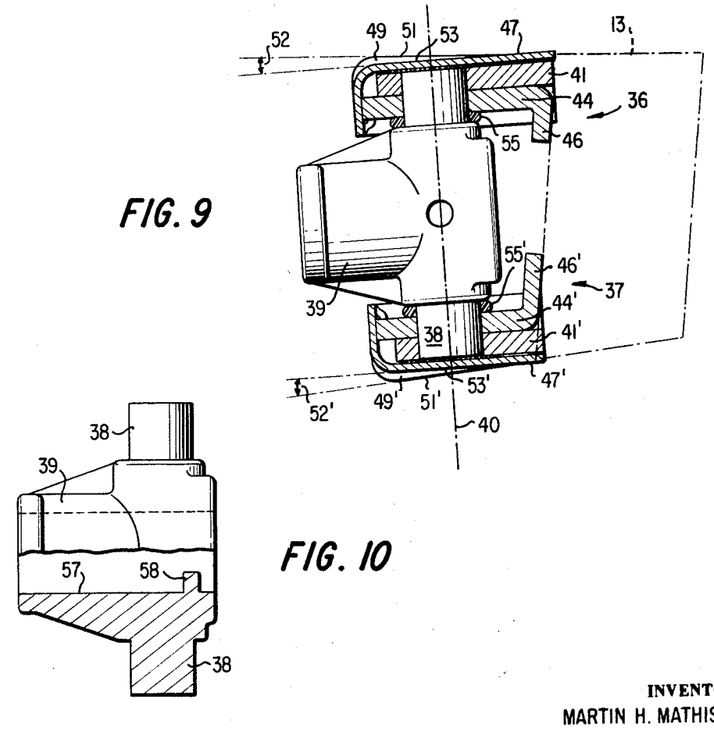
FIG. 9 is a sectional view of the hitch head on line 9—9 of FIG. 6 with the trunnion shown in elevation and the upright plate in phantom lines.
FIG. 10 is a side elevation partly in section of the trunnion.

Extending at right angles to axis 40 each trunnion has a socket 57 and across the bottom of each socket there is a lug 58, as shown in FIGS. 5, 8 and 10. Each socket snugly receives the round end 59 of spring rod 7. A groove 59A is formed at the top and bottom of the end of the rod leaving a neck portion 60 having a flat side 61. A head or lug 62 having a flat side 63 forming a continuation of side 61 forms one side of each groove 59A. The other end 64 of spring bar 7 is flattened out to provide greater resilience towards that end and has an extension 65 of circular cross section. The extension 65 terminates in crosshead 66. The cross head 66 is adapted to pass through one of the links of chain 8 and then be turned to retain extension 65 in the link. The radius of curvature of extension 65 is the same as the radius of curvature of the end 67 of the link receiving the extension.

A spring bar is assembled with a trunnion by inserting it into the socket and giving it a quarter turn to interlock lug 58 in a groove 59A. Crosshead 66 is passed through a link of chain 8 by placing the link in a horizontal position and the chain 8 is then tensioned by tensioning means 9. The matching radius of curvature of extension 65 and the chain link allows relative movement between the tension bars and tongue B to take place in a smooth and easy manner while the engagement between the parts is fully maintained, it being, of course, necessary to provide for movement between the parts during normal use of the hitch. Due to the interlock arrangements at each end of the spring bars these bars may be assembled in the sockets with either side up or with the sockets in upside down position, and, of course, the bars are interchangeable. This greatly facilitates assembly and eliminates error. It is noted, further, that once a spring bar is assembled with a trunnion it becomes an end part of the spring bar providing pins for pivoting in the walls of the hitch head.

In order to provide sufficient clearance between the end 64 of spring bar 7 and tongue B to permit the upward tensioning by chain 8 it is desirable that each spring bar be inclined downwardly from hitch head 4. By providing the axis of socket 57 at right angles to pin axis 40, pin axis 40 at right angles to walls 36 and 37 and ball shoulder engaging surfaces 51 and 51' at a small inclination to cover planes 53 and 53' the trunnions may be assembled with the head walls with either pin 38 up and the head may be used with either wall up while maintaining the ball axis vertical and the spring bars inclined downwardly, the uppermost surface 51 or 51' being maintained in a horizontal position by proper positioning of plate 13 relative to shank 3 in each position of use. Thus errors in assembly are eliminated and maximum adjustment in use is attained.

The ball assembly with head 4 is shown in detail in FIG. 5. As there shown the ball has a threaded shank 68 received in hole 43 and is attached to the head by nut 69. Shoulder 70 of the ball cooperates with surface 51 to rigidly position the ball with its axis vertical in normal position of use. As explained heretofore the ball may be detached from wall 36 and attached to wall 37 when and if that wall is uppermost, in that case the shoulder 70 of the ball being positioned against surface 51', which will be horizontal when in uppermost position as was surface 51 when it was uppermost so that the ball at all times will have a normal position with its axis vertical.

Figure 4:
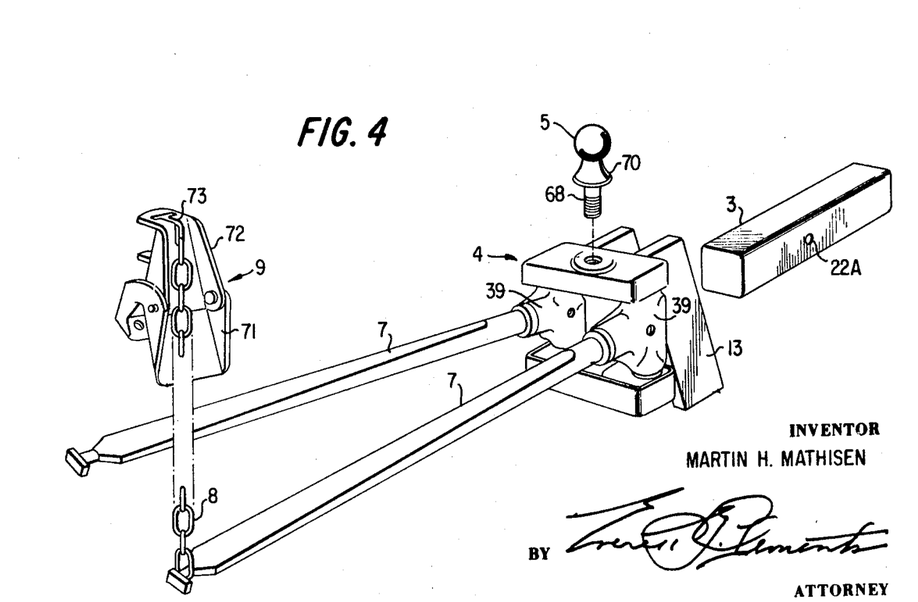
FIG. 4 is an exploded perspective view of a portion of the hitch shown in FIG. 1.

The tensioning means 9 is best shown in FIG. 4. It comprises a clamp portion 71 for clamping onto a beam 6 of tongue B and a chain holding arm 72 pivoted to clamp 71. Arm 72 is provided with a slot 73 to receive a link of chain 8. A link of chain 8 is passed through slot 73 while arm 72 is pivoted clockwise downwardly from the position in FIG. 4. After assembly of chain 8 with arm 72 it is pivoted counterclockwise to an overcenter position to hold chain 8 under tension. Suitable means may be provided to hold arm 72 in its overcenter position. Tensioning means 9 is essentially the same as the chain tensioning means shown in FIGS. 1 and 3 of my U.S. Pat. No. 3,220,749, Nov. 30, 1965.

Figure 13:
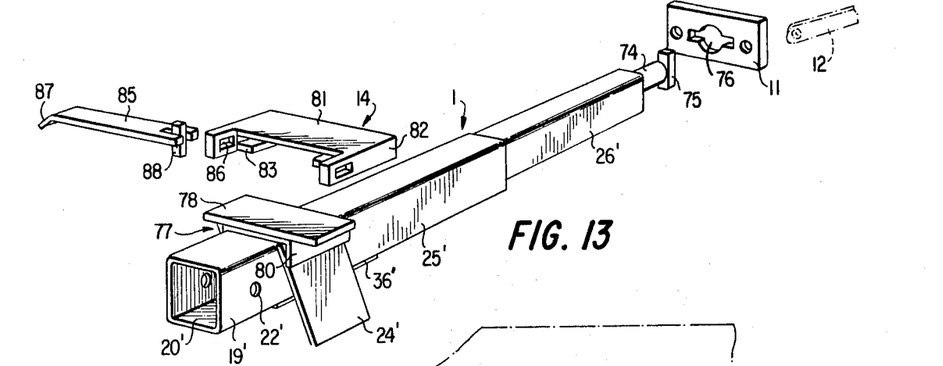
FIG. 13 is an exploded perspective view of the tow bar of FIG. 1 and cooperating parts.
Figure 14:
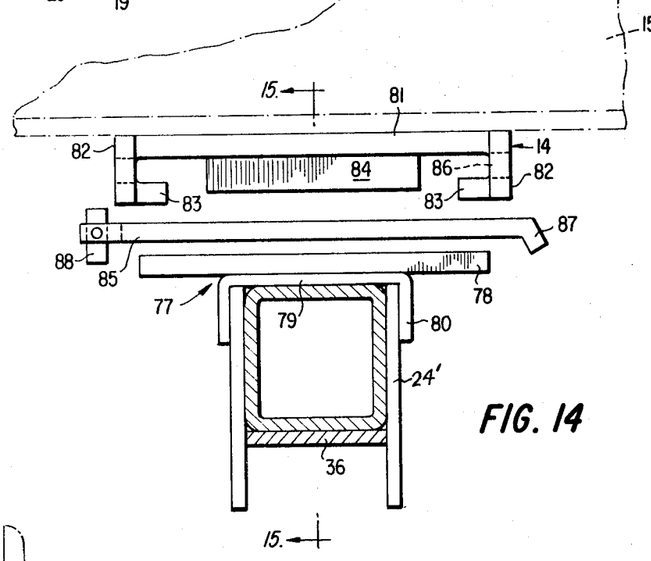
FIG. 14 is an exploded front elevation view of the tow bar, cradle and locking pin and the attaching angle in phantom lines.
Figure 15:
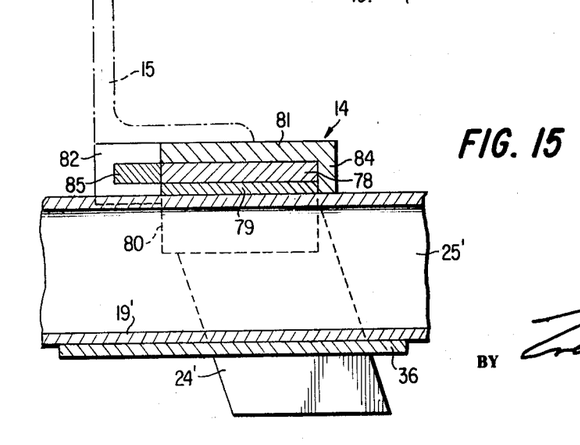
FIG. 15 is a section taken on line 15—15 of FIG. 14 but with the parts assembled.

The tow bar 1 and associated structure is shown in detail in FIGS. 13, 14 and 15. This tow bar has a socket 19', with a square cross section interior 20' for snugly receiving shank 3 and holes 22' in opposite sides of the socket for receiving a locking pin to hold the shank in position, plates 24', tubular strut 25' and tubular strut 26' all essentially the same as and welded together in the same way as the corresponding parts of tow bar 18 shown in FIG. 3. A reenforcing strip 36' may be welded to the underside of the socket 19' and tubular strut 25' and to the plates 24' as explained in connection with FIGS. 1 and 3. To the forward end of strut 26' is secured a cylindrical extension 74 carrying at its forward a crosshead 75. Plate 11, which is attached to side frame members of vehicle A by straps 12, similar to straps 29 of FIG. 3, has a double keyhole slot 76, comprising a round central portion and two extensions, which is adapted to receive the crosshead 75 when turned horizontally and lock it when turned vertically.

A bracket 77 comprises a spring plate 78 welded to the web 79 of a channel member having downturned legs 80, the legs 80 being welded to plates 24' and the web 79 being welded to socket 19' and strut 25'. The overhanging side ends of spring plate 78 are received in a channel or pocket portion of cradle 14 which is welded to angle 15, as shown in FIG. 1. The interior channel or pocket of the cradle is formed by top wall 81, downturned side walls 82 and inturned flanges 83. A downturned end wall 84 acts as a stop to limit movement of the pring plate in the channel. After the spring plate 78 is slid into the channel the lock pin 85 is slid through holes 86 formed in the downturned walls 82. The lock pin has a downturned flange 87 at one end and a pivoted keeper lug 88 at the other end. As seen in FIG. 14 it is slid through holes 86 from right to left with lug 88 in the plane of the pin, after which the lug 88 is turned to hold the lock pin in place.

It will be noted that when tow bar 1 is assembled with vehicle A the towing force is transmitted to the vehicle by cradle 14 and plate 11 transmits only lateral forces, both vertical and horizontal to the vehicle.

Angle iron 15, cradle 14 and plate 11 may be considered as permanently attached to vehicle A but the tow bar 1, including bracket 77 welded thereto is readily detachable from or attachable to the vehicle.

To assemble the tow bar with the vehicle the forward end of the tow bar is lifted while the crosshead 75 is horizontally oriented. The crosshead is then passed through the slot 76 and the tow bar is given a quarter turn. This locks extension 74 in slot 76 and positions spring plate 78 for insertion into the interior channel of cradle 14. The rear end of the tow bar is then lifted to line up the spring plate 78 and the cradle and the tow bar is then moved forwardly to place the spring bar in the cradle. Locking pin 85 is then inserted to hold the tow bar in place. As is evident, disassembly may readily be effected by using the same steps in reverse.

Since tow bar 1 may readily be assembled with or disassembled from vehicle A it is not necessary for the user to maintain it assembled with the vehicle at such times as he is not using a trailer. Since road clearance of a vehicle is much reduced when a tow bar is used it is a decided advantage to be able to take it off at such times and easily assemble it again when a trailer is used once more.

Figure 16:
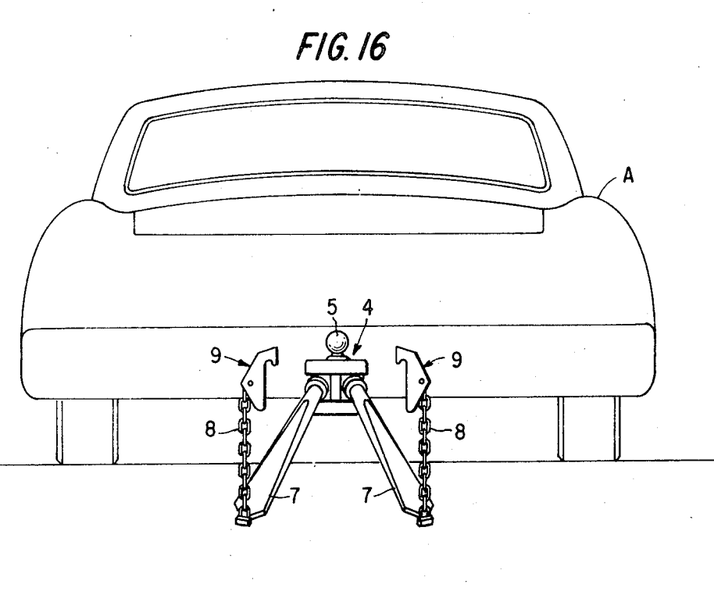
FIG. 16 is a rear elevation of a towing vehicle with my hitch connected to it, but not showing the tongue of the trailer.
Figure 17:
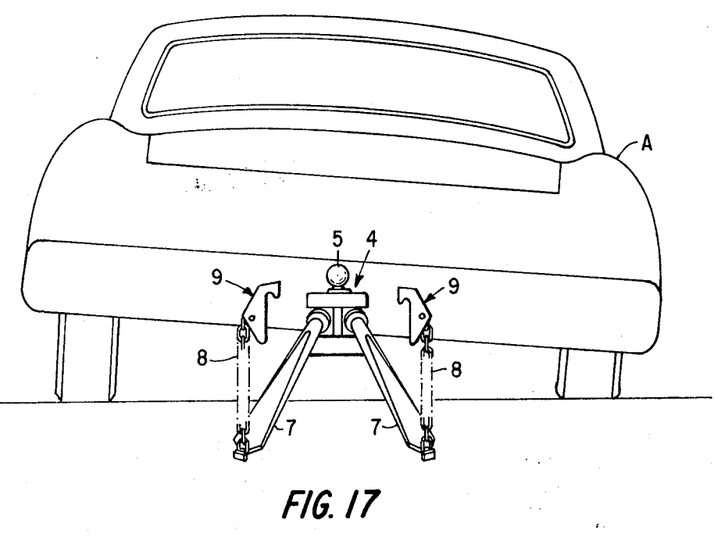
FIG. 17 is a rear elevation like that of FIG. 16 but showing the towing vehicle in a twisted position with respect to the trailer.

The spring connection of tow bar 1 to vehicle A by means of spring plate 78 and cradle 14 is an important feature. Due to the spring plate, tow bar 1 may oscillate about its longitudinal axis with respect to vehicle A independently of the wheel springs since tow bar 1 is attached directly to the frame of the vehicle and not to the rear axle, as are some prior art tow bars. Thus, as shown in FIGS. 16 and 17 when vehicle A tilts or twists about its longitudinal axis relative to the trailer due to road conditions the head 4 and spring bars 7 maintain a substantially normal position. Without the spring connection 78 the left hand spring bar 7 in FIGS. 16 and 17 would rise and the right hand spring bar 7 would tend to lower. As vehicle A would tilt to one side or the other one or the other of the spring bars would come under increased tension and the opposite spring bar 7 would be decreased in tension. Tongue B and the trailer would thus tend to tilt or twist about the longitudinal axis and the load of the trailer would be transferred with increased force to one side or the other of the towing vehicle thus accentuating the tilting due to road conditions and tending to throw the vehicle out of control. Spring bar 78 also acts to reduce road shock on the vehicle or trailer even under conditions of no twist. Constant tension load on spring bars 7 also tends to be maintained due to spring plate 78 when the load of the vehicle and trailer vary.

It is to be understood that while I have disclosed a specific preferred embodiment of my invention, such is illustrative only and the scope of my invention as defined in the appended claims is not limited thereto.

I claim:

1. A head for a load transferring trailer hitch comprising top and bottom walls, a trunnion pivoted in said top and bottom walls on an axis perpendicular thereto, said trunnion having end pins pivoted in closely fitting openings in said top and bottom walls and having a socket portion extending at right angles to said axis adapted to receive the end of a spring bar, a surface on the top wall for receiving one part of a hitch coupling, said surface making an acute angle with the axis of the trunnion, the axis of the trunnion being inclined upwardly and rearwardly to the vertical when the head is in normal position of use.

2. A head for a hitch as in claim 1 in which there is also a surface on the bottom wall making an acute angle with the axis of the trunnion for receiving one part of the hitch coupling when the head in inverted whereby the head is adapted for use with high or low clearance towing vehicles by inverting it, changing its level with respect to said vehicle while maintaining the surface on top in a normal position of use and attaching the coupling to whichever wall is on top.

3. A head for a hitch as in claim 1 in which there is a lubricant between each of the pins and the walls.

4. A load transferring hitch comprising a head as in claim 1 in which said trunnion is duplicated and each socket portion receives an end of a load transferring spring bar, each socket portion having a lug and each spring bar having at one end a groove extending partially circumferentially around the bar for interlocking with the lug, the other end of each spring bar having a cylindrical portion received in the link of a chain for tensioning the spring bar, the radius of each of the cylindrical portions corresponding to the internal radius of the link, whereby the spring bars are interchangeable and may be assembled in the device with either side up.

5. A head for a load transferring hitch comprising walls and a trunnion for pivoting an end of a load transferring spring bar relative to said walls, said trunnion having a pin at each end, each pin being received in a recess in a said wall, a gasket being positioned at the end of each pin between it and the adjacent wall and a washer surrounding the base of each pin, the gaskets and washers acting as closure means for retaining lubricants on said pins.

6. In a load transferring trailer hitch, a head for receiving a trailer hitch coupling, load transferring spring bars pivoted thereto and a tow bar for attaching said head to a towing vehicle, said tow bar adapted to extend longitudinally of the vehicle and including a resilient means for connection to the frame of the vehicle, all connections of said tow bar with said vehicle being independent of any spring connections between the vehicle frame and the wheels and permitting oscillation of the tow bar relative to the frame of the vehicle about the longitudinal axis of said tow bar.

7. In a load transferring hitch, a tow bar for connection to the underside of a towing vehicle, said tow bar having a projection at one end adapted to interlock with said vehicle and a keeper spaced from said projection in the direction of the other end, said keeper having shoulder means oriented for sliding engagement in the longitudinal direction of the tow bar with a support mounted on the vehicle whereby the tow bar may be readily assembled with the towing vehicle by interlocking it with the vehicle at one end and sliding the shoulder means relative to the support mounted on the vehicle.

8. The subject matter of claim 7 in which said tow bar has a key and a key hole interlock with the vehicle at said one end, the parts being constructed and arranged whereby the tow bar may be readily assembled with the towing vehicle by inserting the key in the key hole, turning the tow bar to lock the key in the key hole and sliding the keeper relative to the supporting member.

9. The subject matter of claim 8 in which the keeper is a resilient plate and the supporting member is a channel member secured to the underside of the towing vehicle, the channel member having inturned flanges retaining the ends of the resilient plate and a stop flange against which one side of said plate abuts, and a locking key traverses flanges of the channel member to hold the plate in place.

10. For use in a load transferring hitch between a towing vehicle and a trailer which has a tongue extension, said hitch having a head adapted to be attached to the towing vehicle, said head having a socket with a lug therein, the socket opening towards the trailer, and a flexible member adapted to be attached to the tongue extension of the trailer; the improvement comprising a load transferring spring bar adapted to extend between and cooperate with the socket and the flexible member, the socket end of the bar having lug means extending upwardly and downwardly therefrom for selectively interlocking with the lug in the socket and the other end of the bar having means for interlocking with the flexible member, the last named interlocking means including a cylindrical portion bearing against a part of the flexible member, the cylindrical portion and said part of the flexible member having corresponding radii of curvature, whereby the spring bar may be assembled with the flexible member and the socket with either side up and with the socket in either of inverted positions.

11. In a load transferring trailer hitch, a head having top and bottom walls, a pair of trunnions pivoted in said top and bottom walls on axes perpendicular to said walls, a surface on the top wall for receiving one part of a hitch coupling, said surface disposed at an acute angle with the axis of each trunnion, the axis of each trunnion being inclined upwardly and rearwardly when in normal position of use, load transferring spring bars attached to said trunnions, and means for attaching said head to a towing vehicle, said means adapted to extend longitudinally of the vehicle and including a resilient means adapted for connection to the frame of the vehicle, all connections of said attaching means to said vehicle being independent of any spring connection between the vehicle and the wheels, for permitting oscillation of the attaching means relative to the frame of the vehicle about the longitudinal axis of the attaching means.

12. A hitch as in claim 11 in which the means extending longitudinally of the vehicle comprises a tow bar which has a socket portion on one end thereof for receiving a shank bar attached to the head and a lug on the other end thereof for reception in an opening provided in a plate attached to the towing vehicle, the resilient connection comprising a resilient plate member attached to an intermediate portion of the tow bar which is adapted to be received in a pocket in a member adapted to be attached to the frame of the towing vehicle.

13. In a load transferring hitch, a head comprising top and bottom walls, means extending between said walls for pivoting the end of a load transferring spring bar relative to said walls and means on each of said walls for receiving one part of a hitch coupling; and connecting means secured to said head and extending vertically beyond said head at one end for attaching said head to a shank bar said connecting means extending downwardly from said head when said shank bar is associated with a towing vehicle of relatively load road clearance, said head being inverted and said connecting means extending upwardly from said head when said shank bar is associated with a towing vehicle of relatively high road clearance, the hitch coupling part being secured to whichever wall is on top.

14. A head for a load transferring hitch comprising top and bottom walls and means extending between said walls for pivoting the end of a load transferring spring bar relative to said walls, a pin at each end of said means and a recess in each wall receiving a said pin in closely fitting relationship, load bearing portions of said walls extending over the ends of said pins and a solid film lubricant between the pins and the surrounding walls.

15. In a load transferring trailer hitch, a tow bar for connection to the underside of a towing vehicle, one end of said tow bar having means for receiving a portion of a hitch for articulated connection to a trailing vehicle, the other end of said tow bar having means for connection to the towing vehicle to resist lateral movement but permit oscillation about the longitudinal axis of the tow bar and means for resilient connection of said tow bar to said towing vehicle all connections of said tow bar to said towing vehicle being independent of any spring connection between the vehicle body and the wheels and permitting oscillating movement of said tow bar relative to the body of said towing vehicle about the longitudinal axis of the tow bar.

* * * * *